I. L. LANDIS.
MOLDING APPARATUS.
APPLICATION FILED APR. 1, 1905. RENEWED NOV. 17, 1909.
978,903.
Patented Dec. 20, 1910.
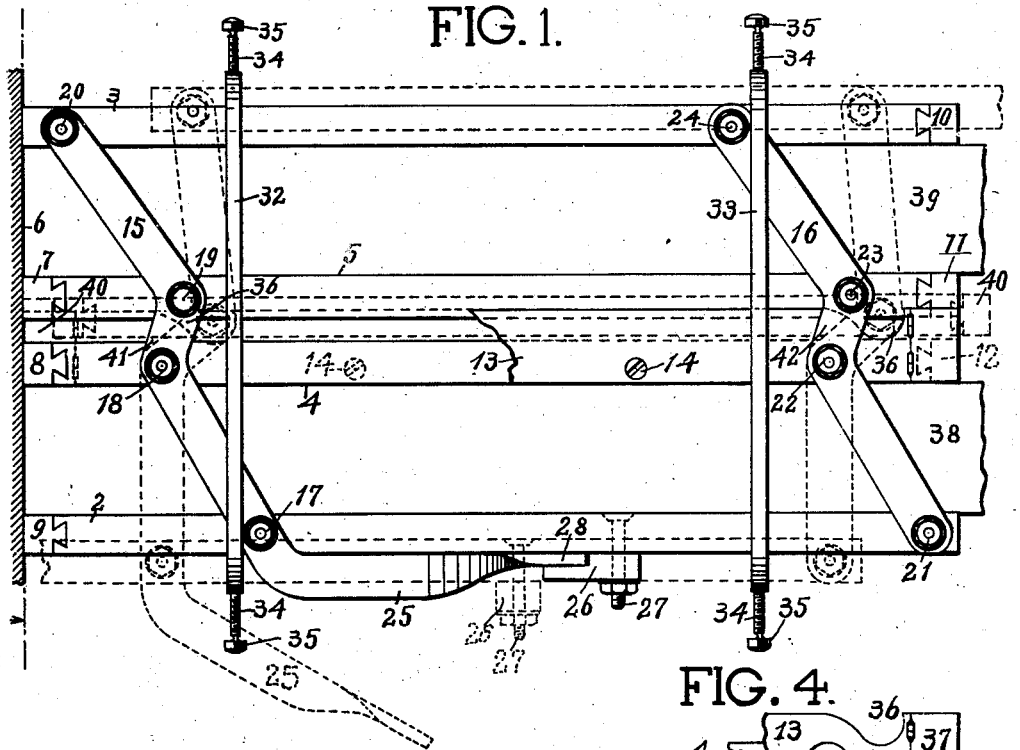
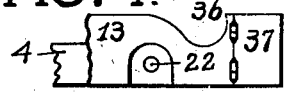
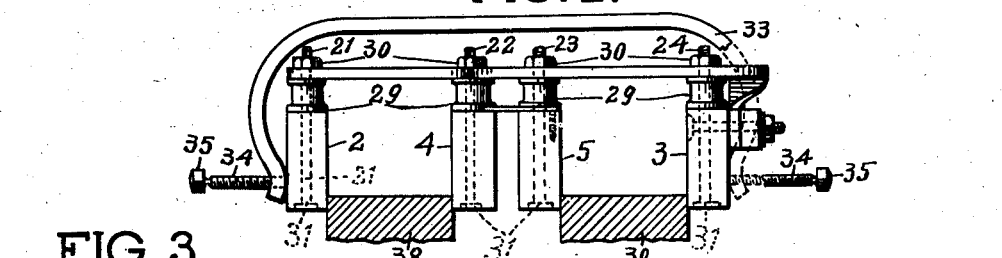
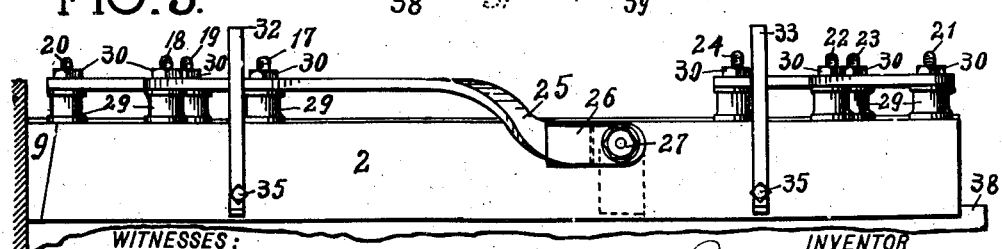

UNITED STATES PATENT OFFICE.

ISRAEL L. LANDIS, OF CHICAGO, ILLINOIS.

MOLDING APPARATUS.

978,903.  Specification of Letters Patent.  Patented Dec. 20, 1910.

Application filed April 1, 1905, Serial No. 253,351.  Renewed November 17, 1909. Serial No. 528,593.

*To all whom it may concern:*

Be it known that I, ISRAEL L. LANDIS, a citizen of the United States, residing at Chicago, in the county of Cook and State of Illinois, have invented certain new and useful Improvements in Molding Apparatus, of which the following is a specification.

This invention relates to machines for molding concrete, cement, etc., and has particular reference to general utility machines whose construction adapts them for building hollow and solid walls, fence posts, door and window casings, etc., and the object of the invention is to provide a simple and at the same time powerful mechanism for moving or releasing the sides of a mold-box used for molding complete individual structures such as building blocks, cement posts, etc., or for releasing the mold boards in hollow or solid wall machines.

A still further object of the invention is to provide an operating mechanism applicable with equal facility to a single pair of mold boards and a plurality of pairs, and where a single lever will operate directly, without intervening mechanisms, two or more mold boards, or the mold-boards and the core-boards, and where said single lever will coöperate with either a solid or collapsible core or core-boards and outer mold-boards; to make said single lever applicable to either a single or double mold for fence posts.

The invention consists in the novel construction and combination of parts adapted to carry out the foregoing objects and such additional objects as will appear in the subjoined description.

In the accompanying drawings forming a part of this specification—Figures 1, 2 and 3, are, respectively, a top plan view, an end elevation and a side elevation of a molding machine embodying one form of my invention. Fig. 4 is a broken-away detail portion taken from Fig. 1.

Referring to Figs. 1 to 4 inclusive, 2 and 3 represent the outside mold-boards and 4 and 5 the inner mold-boards or core-boards.

6 represents the wall line or side of a wall against which the machine is placed preparatory to molding a section of hollow wall.

7, 8, 9, 10, 11 and 12 represent removable wedge-shaped extension-pieces removably dove-tailed into the ends of the respective mold-boards. By removing the extension pieces adjacent to an abutting wall spaces are provided for the ends of sides 2, 4 and 5 to move into when operated to release said sides. A top plate 13 is secured by screws 14 to the mold-boards 4, which plate serves as a cover preventing the spilling of concrete between the walls during the work of molding. Operating levers 15 and 16 are each pivoted to all of the boards 2, 3, 4 and 5, the former being pivoted at 17, 18, 19 and 20 and the latter at 21, 22, 23 and 24. Lever 15 has a handle 25 paralleling the side or board 2 when the machine is in molding position and said lever may then be locked against movement and to hold the mold-boards in their proper relative positions, by means of a catch 26 mounted on a pivot 27. By rotating this catch it will be disengaged from the portion 28 of the handle 25 preparatory to operating the lever. The levers 15 and 16 are preferably elevated a short distance above the edges of the mold-boards by means of spool-shaped blocks 29 interposed between the mold-boards and levers, to facilitate access underneath the members 15 and 16 for the purpose of packing or tamping the plastic material. The upper ends of pivot-rods or bolts are provided with nuts or burs 30 which hold the members 15 and 16 in place. These pivots are preferably extended through the full width of each mold-board, as shown by dotted lines, and provided with heads 31. The outer boards 2 and 3 are held against spreading movement when the material is being tamped or packed in, by means of yokes 32 and 33 having downwardly-bent ends which carry bearing-screws 34 having heads 35 to which a wrench may be applied. In the cover-plate 13 are slots 36 into which pivots 19 and 23 may move when swinging about oppositely disposed pivots in adjacent core-boards. Each end of cover 13 is in the form of a hinged lid 37 which may be raised to uncover the extension pieces so that they may be removed preparatory to releasing the machine from a freshly formed wall section. 38 and 39 the inner and outer sides of a hollow wall section and 40 is the space between the wall sides provided for by the core-boards 4 and 5. The members 15 and 16 have portions 41 and 42 bent out of alinement with the opposite ends of said members which places pivots 18, 19, 22 and 23 in position to move the core-boards immediately toward each other when the outer boards move away from each other. The arc of rotation of each core-board pivot relative to its companion pivot is therefore arranged in the direction of the hollow space between the core-boards while the arcs of rotation of the pivots on the outer boards are arranged in directions away from the sides of the mold boards when the latter are in molding position, and vice versa.

In carrying out my invention I do not wish to be confined to the fixed pivot-centers. The lever fulcrumed, as it were, upon all of the mold-boards, or all of the mold-boards and core-boards (whichever pivot or set of pivots serving as fulcrum, being determined by the order in which the boards yield adhesion to the plastic material) may be varied in numerous ways without departing from the spirit of my invention.

What I claim as new and desire to secure by Letters Patent is—

1. The combination of a pair of mold-boards, with a pair of core-boards, the latter arranged to move toward and from each other and the former arranged to move, respectively, from and toward each other, the levers 15 and 16 having the bent portions 41 and 42, each of said levers pivoted to all of said mold and core boards, one of said levers having a handle normally parallel to said mold-boards, the catch 26 for locking said handle to the mold-board, and the bent yokes 32 and 33 and their adjusting screws for supporting the mold-boards against spreading apart at their lower edges.

2. The combination of a pair of mold-boards, with a pair of core-boards, the levers 15 and 16 pivoted to all of said boards and arranged to impart expanding movement to said mold-boards and simultaneously contracting movement to said core-boards, or contracting movement to said mold-boards and expanding movement simultaneously to said core-boards, the extensions removably secured to the ends of said core and mold boards to permit longitudinal movement thereof, and means for supporting said mold-boards against spreading movement.

3. The combination of outer mold-boards with inner core-boards, levers 15 and 16 for moving said mold-boards in opposite directions and for moving said core-boards in opposite directions, one of said core-boards provided with the cover or plate 13 overlapping the other core-board and having the hinged portion 37 covering, normally, the removable end extensions of said core-boards, and the removable end extensions of said core-boards and mold-boards.

4. The combination of mold-boards 2 and 3 with core-boards 4 and 5 provided with the cover 13 having hinged portions 37, all of said boards having removable end extensions such as 7 or 8, the levers 15 and 16 pivoted to all of said boards and having pivots for the core-boards arranged out of alinement with the pivots for the mold-boards, said levers serving to yoke the upper edges of the mold and core-boards together and to also move said boards relatively to each other, means for locking at least one of said levers and boards together against relative movement and means for yoking the lower edges of said mold-boards together against spreading movement.

5. The combination of mold-boards 2 and 3, with core-boards 4 and 5, the latter provided with the cover 13 spanning the space between said core-boards, extensions such as 7 and 8 for said core and mold boards, the hinged lids 37 normally covering said extensions, the levers 15 and 16 crossing the tops of all of said mold and core boards and pivoted separately to each thereof, the blocks 29 interposed between the tops of said mold and core-boards, one of said levers provided with an operating handle 25 and one of said mold-boards provided with the catch 26 adapted to engage said handle, the pivots connecting said core-boards and mold-boards arranged to swing the core-boards toward each other and to simultaneously swing the mold-boards away from each other, or to reverse said movements, and separate means for yoking the lower edges of mold-boards together against relative movement away from each other.

In testimony whereof I have hereunto set my hand in the presence of two subscribing witnesses.

ISRAEL L. LANDIS.

Witnesses:
D. WHITFORD,
FRED. L. KOEHLER.